Patented Dec. 29, 1936

2,065,664

UNITED STATES PATENT OFFICE 2,065,664

MANUFACTURE OF ARTICLES FROM CELLULOSE ESTERS OR ETHERS

William Alexander Dickie and Percy Frederick Combe Sowter, Spondon, near Derby, England, assignors to Celanese Corporation of America, a corporation of Delaware No Drawing. Application March 19, 1931, Serial No. 523,929. In Great Britain May 21, 1930

8 Claims. (Cl. 18—54)

This invention relates to the manufacture of film, threads, yarns, ribbons, filaments, sheets or other products having a basis of cellulose acetate or other cellulose ester or ether.

The dry spinning of solutions of cellulose acetate or other cellulose esters or ethers to form filaments, ribbons, films and other products depends, as practised hitherto, on an evaporation of a volatile solvent from the solution. We have now discovered an entirely new method of dry spinning or dry forming of products which is not dependent upon any evaporation of volatile solvent. In the dry spinning process of the present invention the cellulose derivative is dissolved in a substance or mixture of substances which are relatively non-volatile and are solvents for the cellulose derivative at elevated temperatures but which are non-solvents at lower temperatures. We have found that by spinning solutions of cellulose acetate or other cellulose derivatives in such substances valuable filaments, ribbons, and other products may be produced.

We have further found that the glycols, for instance ethylene glycol, diethylene glycol, propylene glycol, tri-methylene glycol, 1.2- and 1.3-butylene glycols and glycerin, the mono-ethers of glycerin, and other polyhydric alcohols have the very valuable property of dissolving cellulose derivatives at elevated temperatures and of being non-solvents or substantially non-solvents at lower temperatures and particularly at atmospheric temperatures. Furthermore the glycols, glycerin and other polyhydric alcohols do not dissolve in the cellulose derivative to an appreciable extent at atmospheric temperature so that on cooling a solution of a cellulose derivative therein substantial separation of the glycol, glycerin or the like from the cellulose derivative takes place, this process, as will be seen, being independent of evaporation of volatile solvent. For the purpose of spinning filaments, ribbons, films and other products according to the present invention it is particularly desirable to use liquids of this type which are non-solvents and are not solutes at ordinary temperatures but are solvents at elevated temperatures.

The cellulose acetate or other cellulose derivative may for example be dissolved in ethylene glycol or in glycerin with constant stirring, the temperature being steadily raised until the cellulose acetate is completely dispersed in the solvent. In the case of forming 20% to 25% or 30% solutions of cellulose acetate this occurs very readily at about 170 to 180° C. with glycol, and at about 180 to 200 or 210° C. with glycerin. Care may be necessary in forming the solution or dispersion since the cellulose acetate being specifically lighter than glycol or glycerin is apt to float on the top of the liquid and make dispersion difficult. With adequate stirring however this difficulty may be easily avoided. The dispersion or solution of the cellulose derivative in the glycol, glycerin or the like may be facilitated by mixing the solid cellulose acetate with glycerin or glycol at ordinary temperatures and allowing it to soak for some time before raising the temperature. With good stirring a homogeneous solution or dispersion is then readily obtained at temperatures of 140 to 170° C. even in the case of glycerin.

As already indicated the solutions may contain pigments which may be coloured in order to obtain coloured filaments, films and the like or may be white so as to produce filaments, threads or the like of reduced lustre. Such white pigments may for example be barium sulphate, zinc oxide, titanium oxide and other pigments referred to in U. S. applications S. Nos. 444,622 filed 15th April, 1930 and 464,122 filed 26th June, 1930, or they may be organic substances, as for example diacetyl benzidine, dibenzoyl benzidine, α-dinaphthyl urea and other organic substances referred to in U. S. application S. No. 473,781 filed 7th August, 1930.

The solution or dispersion maintained at a temperature sufficiently high to produce the fluidity necessary for spinning or extrusion may then be forced through jets to give filaments, or bristles (for use as artificial horse hair) or through suitable slits or over weirs or the like to produce ribbons, films and sheets. Heavy products, such as films, bristles and sheets, are preferably taken up by means of rollers or rotating wheels or other supporting devices so as to prevent breakage from the point of extrusion or formation.

The formation of filaments, ribbons and the like may take place in an apparatus substantially similar to that customarily employed in the ordinary dry spinning or evaporative method. Special devices may be adopted to maintain the temperature of the spinning solution at the required value up to the point of extrusion. For example the candle or filtering or other chamber through which the solution passes just prior to extrusion may be surrounded by a heating jacket, the temperature of which is adjustable, or the solution may be otherwise passed through suitable attemperating means, and during its further passage to the jet or nozzle be insulated as described in U. S. application S. No. 375,151 filed 1st July, 1929 of Dr. Henry Dreyfus. The spinning cell, if such be used, or the atmosphere into which the solution is extruded may be maintained at atmospheric temperature or at any suitable higher temperature, and if desired adjustments may be made so that there is a progressive cooling of the spinning solution from the nozzle to the point of take up of the products. Further, to facilitate spinning or drawing out or to obtain special effects, the spinning atmosphere may contain vapours of acetone or other solvents and/or vapours of water, benzene, xylene, alcohols or other non-solvents for the cellulose derivative.

The present invention further includes a process in which instead of spinning the solutions of cellulose acetate or other cellulose derivative in liquids which are solvents at high temperatures, but are non-solvents at lower temperatures by a dry spinning method, the solutions are spun by a wet process into suitable coagulating baths, for example into baths of water or other liquids which are non-solvents for the cellulose derivative and which dissolve the glycerin, glycol or other solvent present in the spinning solution. Glycerin or glycol itself may constitute the coagulating bath or they may be used in admixture with other non-solvents, such as water, for the cellulose derivative. In order to improve the draw-out still further the coagulating baths may contain solvents, for example acetone, diacetone alcohol, diethyl phthalate, lactic acid, dioxane, tricresyl phosphate, diethyl tartrate and the like, and/or salts, e. g. sodium chloride, sodium acetate, or ammonium sulphate, or sugars. For details as to suitable coagulating baths reference is made to U. S. applications S. Nos. 402,785 filed 26th October 1929, 418,414 filed 3rd January, 1930 and 469,622 filed 21st July, 1930. Such baths may if desired be maintained at atmospheric temperature or at a temperature above atmospheric, or a series of baths may be used of progressively changing temperatures. Thus there may be a series of baths maintained at steadily decreasing temperatures or such decreasing temperatures may be obtained in a single bath. For example a solution in glycerin may be spun downwards into a bath of water which is hot or relatively hot at the top and cool towards the bottom.

Whichever process be adopted for spinning, i. e. the wet coagulation method or the special dry spinning process described above, it is found that the solutions used according to the present invention are valuable in that they yield filaments having a substantially circular cross-section. This has been a great difficulty in the past in spinning by the dry or evaporative method and in consequence the present invention represents a considerable advance in the art. The filaments, threads, ribbons and other products may be drawn out to fine deniers or to thin products by application of suitable tension or stretch, or on the other hand, the process of the invention may be utilized to obtain comparatively thick products, such as films, bristles, artificial horse hair and the like. The strength and other valuable properties of the products may be still improved by applying thereto an additional stretch after the products are completely set or coagulated or while they are still in a plastic or softened condition.

In the case of filaments, threads and thin ribbons or films the glycol, glycerin or the like separates very easily from the product and may be removed by washing or centrifuging. The washing may for example be carried out continuously with the production of the filaments or other products, and if the dry spinning method be employed to form the filaments or other products the combined operation may be regarded as a continuous dry and wet spinning process. In the case of thicker products such as thick films or sheets the separation of glycol or glycerin from the product may be facilitated by passing the products through rollers or otherwise subjecting them to pressure. The rollers or other pressure devices may if desired be maintained at elevated temperature. Sheets formed in this way may be cut or otherwise worked into any suitable articles as required.

Any of the products of the present invention may be treated to produce special effects after or continuously with their manufacture. For example they may be treated with steam and preferably wet steam or with hot or boiling aqueous liquids to produce a delustered or milky product. It appears that such products are more or less permanently delustered as opposed to the products produced by treating ordinary dry spun cellulose acetate filaments with the aid of boiling water or moist steam, which may have their lustre restored by treatment with solvents or by ironing.

Though the invention has been described with particular reference to cellulose acetate, it may also be applied for the manufacture of products having a basis of any other cellulose derivative, for example cellulose esters, e. g. cellulose formate, cellulose propionate, cellulose butyrate or cellulose esters of acids containing a comparatively large number of carbon atoms, such as cellulose laurate, or mixed cellulose esters, for instance cellulose aceto-nitrate, or cellulose ethers, e. g. methyl, ethyl or benzyl cellulose, or mixed cellulose ethers or mixed cellulose ether-esters. Again though spinning solutions of cellulose derivatives of 20 to 30% concentration have been indicated above the invention is by no means limited to these concentrations, and lower concentrations, for example of the order of 10 to 20%, may be used, and in addition much higher concentrations such as 30 to 50 or 75% or more, of cellulose derivative may be used. These higher concentrations are particularly valuable in the case of manufacturing ribbons, films and sheets.

The following examples illustrate the invention but are not to be considered as limiting it in any way:

Example 1

50 parts of finely shredded cellulose acetate are dissolved with constant stirring in 120 to 150 parts of glycol maintained at 180° C. The solution thus obtained is forced into a candle and spinning jet maintained at 140° C. and extruded therethrough into the cells of a dry spinning metier at 100° C., the pressure and delivery of the spinning solution and the jet orifice being adjusted so as to obtain filaments of about 10 denier at a winding speed of 50 metres per minute. The product may be collected in hanks or by any other suitable method and washed to remove adherent glycol.

Example 2

50 parts of finely shredded cellulose acetate are dissolved with constant stirring in 150 parts of glycol at 180° C. The solution obtained is spun through suitable orifices into a bath containing 80% of glycol maintained at 100° C. or glycerin maintained at 120° C., the threads being drawn off at a speed of 25 metres per minute to obtain filaments of about 5 denier. The bath run is 5 to 8 inches. The products may be collected in a centrifugal spinning box so as to remove excess glycol.

*Example 3*

The solution employed in Example 2 is spun under otherwise equivalent conditions into an aqueous bath containing 25% of diacetone alcohol and 20% of sodium acetate, the bath being maintained at 100° C.

*Example 4*

50 parts of finely shredded cellulose acetate are dissolved with constant stirring in 150 parts of glycerin maintained at 190° C. Before effecting solution the glycerin is preferably heated to above 200° C. in order to remove any water which may be present. If such water be present there is usually a brisk effervescence during the solution of the cellulose acetate. The dispersion or solution obtained is forced at about 120° C. through narrow slits so as to give a thin film which is then taken up by a pair of rollers heated to 100° C. which squeezes out excess of glycerin.

What we claim and desire to secure by Letters Patent is:—

1. Process for the manufacture of filaments, threads, yarns, ribbons, films, sheets and other shaped products, which comprises extruding, at an elevated temperature, into a cool gaseous atmosphere, a composition comprising an organic derivative of cellulose dissolved in a polyhydric alcohol which is a solvent for the cellulose derivative at elevated temperatures only and which is substantially incompatible with the cellulose derivative at ordinary temperatures and which is substantially non-volatile at the temperature of extrusion, the extruded composition being cooled by said atmosphere, whereby substantially complete separation of the cellulose derivative from the polyhydric alcohol is effected.

2. Process for the manufacture of filaments, threads, yarns, ribbons, films, sheets and other shaped products, which comprises extruding, at an elevated temperature, into an aqueous coagulating medium, a composition comprising an organic derivative of cellulose dissolved in a polyhydric alcohol which is a solvent for the cellulose derivative at elevated temperatures only and which is substantially incompatible with the cellulose derivative at ordinary temperatures and which is substantially non-volatile at the temperature of extrusion, the extruded composition being cooled by said aqueous coagulating medium, whereby substantially complete separation of the cellulose derivative from the polyhydric alcohol is effected.

3. Process for the manufacture of filaments, threads, yarns, ribbons, films, sheets and other shaped products, which comprises extruding, at an elevated temperature, into a liquid coagulating medium comprising a polyhydric alcohol, a composition comprising an organic derivative of cellulose dissolved in a polyhydric alcohol which is a solvent for the cellulose derivative at elevated temperatures only and which is substantially incompatible with the cellulose derivative at ordinary temperatures and which is substantially non-volatile at the temperature of extrusion, the extruded composition being cooled by said liquid coagulating medium, whereby substantially complete separation of the cellulose derivative from the polyhydric alcohol is effected.

4. Process for the manufacture of filaments, threads, yarns, ribbons, films, sheets and other shaped products, which comprises extruding, at an elevated temperature, through nozzles, a composition comprising an organic derivative of cellulose dissolved in a polyhydric alcohol which is a solvent for the cellulose derivative at elevated temperatures only and which is substantially incompatible with the cellulose derivative at ordinary temperatures and which is substantially non-volatile at the temperature of extrusion, and cooling the extruded composition, whereby substantially complete separation of the cellulose derivative from the polyhydric alcohol is effected.

5. Process for the manufacture of filaments, threads, yarns, ribbons, films, sheets and other shaped products, which comprises extruding, at an elevated temperature, through nozzles, a composition comprising cellulose acetate dissolved in a polyhydric alcohol which is a solvent for the cellulose acetate at elevated temperatures only and which is substantially incompatible with the cellulose acetate at ordinary temperatures and which is substantially non-volatile at the temperature of extrusion, and cooling the extruded composition, whereby substantially complete separation of the cellulose acetate from the polyhydric alcohol is effected.

6. Process for the manufacture of filaments, threads, yarns, ribbons, films, sheets and other shaped products, which comprises extruding, at an elevated temperature, through nozzles into a liquid coagulating medium, a composition comprising an organic derivative of cellulose dissolved in a polyhydric alcohol which is a solvent for the cellulose derivative at elevated temperatures only and which is substantially incompatible with the cellulose derivative at ordinary temperatures and which is substantially non-volatile at the temperature of extrusion, the extruded composition being cooled by said liquid coagulating medium, whereby substantially complete separation of the cellulose derivative from the polyhydric alcohol is effected.

7. Process for the manufacture of filaments, threads, yarns, ribbons, films, sheets and other shaped products, which comprises extruding, at an elevated temperature, through nozzles, a composition comprising cellulose acetate dissolved in glycerine and cooling the extruded composition, whereby substantially complete separation of the cellulose acetate from the glycerine is effected.

8. Process for the manufacture of filaments, threads, yarns, ribbons, films, sheets and other shaped products, which comprises extruding, at an elevated temperature, through nozzles, a composition comprising cellulose acetate dissolved in ethylene glycol and cooling the extruded composition, whereby substantially complete separation of the cellulose acetate from the ethylene glycol is effected.

WILLIAM ALEXANDER DICKIE.
PERCY FREDERICK COMBE SOWTER.